(12) United States Patent
Allemang

(10) Patent No.: US 6,651,996 B1
(45) Date of Patent: Nov. 25, 2003

(54) SUPPORT STAND FOR WHEELED VEHICLE

(76) Inventor: Merl G. Allemang, 7722 G.R. 150, Salida, CO (US) 81201

( * ) Notice: Subject to any disclaimer, the term of this patent is extended or adjusted under 35 U.S.C. 154(b) by 20 days.

(21) Appl. No.: 09/803,497

(22) Filed: Mar. 9, 2001

Related U.S. Application Data

(60) Provisional application No. 60/230,163, filed on Sep. 1, 2000.

(51) Int. Cl.⁷ .................................................. B60D 1/24
(52) U.S. Cl. ...................................... 280/402; 280/477
(58) Field of Search ................................ 280/402, 292, 280/477; 414/462, 463; 224/924, 534, 537, 521; 403/326, 330, 315, 316, 317, 188; 211/19, 20, 22, 23, 24

(56) References Cited

U.S. PATENT DOCUMENTS

| | | | | |
|---|---|---|---|---|
| 3,822,898 A | * | 7/1974 | Brownlie | 280/402 |
| 3,912,139 A | * | 10/1975 | Bowman | 224/29 R |
| 5,145,308 A | * | 9/1992 | Vaughn et al. | 414/462 |
| 5,226,372 A | * | 7/1993 | Frenkel et al. | 108/51.1 |
| 5,620,197 A | * | 4/1997 | Howes | 280/402 |
| 5,674,044 A | * | 10/1997 | Ranes | 414/563 |
| 5,794,959 A | * | 8/1998 | Scheef, Jr. | 280/400 |
| 5,938,226 A | * | 8/1999 | Transchel | 280/402 |
| 5,988,974 A | * | 11/1999 | Zackovich | 414/563 |
| 6,099,012 A | * | 8/2000 | Mortimer | 280/402 |
| 6,129,476 A | * | 10/2000 | Berman et al. | 403/229 |
| 6,244,813 B1 | * | 6/2001 | Cataldo | 414/462 |
| 6,352,401 B1 | * | 3/2002 | LeMay | 414/463 |

OTHER PUBLICATIONS

"Talegator" Reference—Excerpts from Website 7 pages www.customtow.com.

"McCaddy" Reference—Excerpts from Website www.motorcycletrailer.com 4 pages.

* cited by examiner

*Primary Examiner*—Lesley D. Morris
*Assistant Examiner*—Tony Winner

(57) ABSTRACT

A support device is provided for supporting a wheeled vehicle, such as a motorcycle, in a substantially upright position on a supporting surface. The support device comprises a wheel engaging section to contact and hold a wheel of the vehicle. The wheel engaging section is coupled to a lateral support beam which contacts the supporting surface to resist tilting of the wheeled vehicle. In one embodiment, the lateral support beam is removable from the wheel engaging section to facilitate storing or transporting the support device.

20 Claims, 7 Drawing Sheets

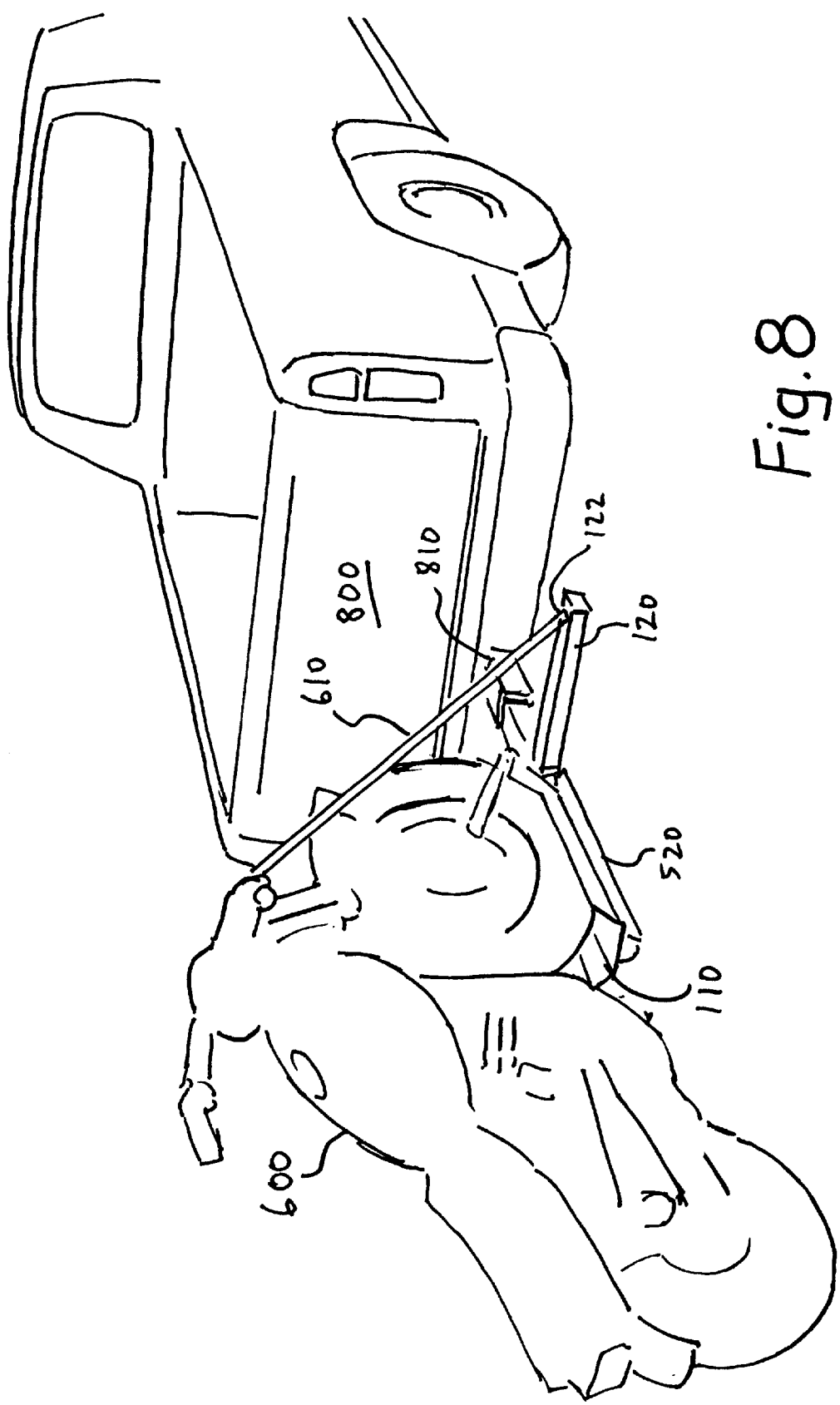

SUPPORT STAND FOR WHEELED VEHICLE

RELATED APPLICATIONS

This application claims priority under 35 U.S.C. 119(e) to provisional U.S. patent application Ser. No. 60/230,163 filed on Sep. 1, 2000.

FIELD OF THE INVENTION

The present invention is related to a stand for supporting a wheeled vehicle and, more particularly, to a stand for maintaining a wheeled vehicle, such as a motorcycle, in a substantially vertical position.

BACKGROUND

Two-wheeled vehicles, such as bicycles or motorcycles, tend to be unstable when they are not in motion. Without some additional support means, such as a kick stand, gravity causes a stationary two-wheeled vehicle to fall over.

People who own, transport or service a two-wheeled vehicle often have a need to maintain the vehicle in a substantially vertical position. While a kickstand generally suffices to support the vehicle at rest, the use of a kickstand alone is often inadequate where the vehicle is subject to other forces. For example, a motorcycle being transported within another vehicle may be subjected to inertial forces, tilting and rocking motions, vibrations and the like which can cause the motorcycle to topple over. A stationary two-wheeled vehicle on solid ground may even be subjected to external forces by gusting winds or flowing water, for example.

The servicing of a vehicle is another situation which may cause external forces to be applied to the vehicle. A person working on the vehicle will likely introduce forces or shift the vehicle's center of gravity by, for example, applying torque to fasteners, hammering, prying, and attaching and removing parts of the vehicle. To prevent property damage and personal injury, it is particularly important that the vehicle remain stable and not fall over while the person is engaged in servicing the vehicle.

Furthermore, to facilitate working upon the vehicle, it is desirable in some instances that the vehicle be supported in a special position, such as with one wheel off the ground, to allow easier access to some parts.

Most kickstands which are designed to be permanently attached to a vehicle are disadvantageous for concentrating into a small area the force needed to hold the vehicle upright. If a kickstand is deployed on a surface that is not hard or sturdy enough, the kickstand will depress into the surface and eventually allow the vehicle to fall over, possibly causing damage or personal injury.

For transporting motorcycles and the like on the bed of a trailer or truck, it is known to attach a rigid structure to the bed which engages a wheel of the motorcycle to some extent. A channel, such as a 'C'-shaped metal extrusion, is often laid down to form a horizontal slot that one wheel of the vehicle can roll onto. At one end of the horizontal piece is placed a vertical portion of channel which engages another portion of the vehicle wheel when the wheel is rolled into place. In practice, the wheel does not seat so securely into the horizontal and vertical channel pieces that the transporting vehicle is sufficiently stable without other measures. Straps or tie-downs fastened to other parts of the transporting vehicle are commonly used to adequately stabilize the transported vehicle. Another disadvantage of the prior art rigid support is that it must be firmly attached to the transporting vehicle, such as the bed of a truck or a trailer. The rigid support means are usually bolted to the surface of the transporting vehicle. Consequently, where numerous two-wheeled vehicles are to be transported on a truck or trailer, the arrangement of two-wheeled vehicles is fixed and not easily changed.

Some implements are known in the art whereby a motorcycle has a wheel placed upon a low-profile dolly of sorts, the dolly being able to roll across a floor and having an inclined surface around its periphery to facilitate initially rolling the vehicle onto the dolly. While this implement facilitates moving a wheeled vehicle around, especially sideways with respect to the direction the wheels normally travel, it does not provide any support for securing the vehicle in a vertical position and does not assist in keeping a transported vehicle secured in or on a transporting vehicle.

Another form of vehicle stand is known in the art wherein a wheel holding and clamping means is permanently coupled to a standard hitch bar. This system incorporates a jack so that, after the device is set into a hitch receiver on a towing vehicle and the towed vehicle is rolled into the holder and clamped in place, the towed vehicle may be raised to proper height for towing. For supporting a vehicle on a shop floor or the like while not being towed, separate stand is provided for this device which comprises a hitch receiver and a metal frame providing a wide stance to support the vehicle in a free-standing manner. The stand portion of this system comprises large members that extend for a substantial portion along the length of the supported vehicle on either side. The stand portion also rises for a distance to place the hitch receiver at a typical vehicle bumper height.

What is required is a device for holding a wheeled vehicle in a substantially upright position while not requiring permanent attachment to a supporting surface, such as a floor or the bed of a transport vehicle.

It is further desirable to provide a device that supports a vehicle without interfering with access to parts of the vehicle that are to be serviced.

It is further desirable to provide a device for supporting a vehicle which is secure yet compact enough to allow supported vehicles to be arranged near one another on a supporting surface so that storage space is used efficiently. Such a device preferably would not extend outward or alongside the vehicle in such a manner that would impede ready access to all parts of the vehicle.

It is even further desirable to provide such a support device that is lightweight and easily stowed in a small space when not being used to support a vehicle.

Even some vehicles, such as carriages, sidecars, farm implements, and the like having three or more wheels could be better held and stabilized if such a supporting means were devised.

SUMMARY

The present invention is directed to a support device for stably supporting a wheeled vehicle in a substantially upright position.

In accordance with an exemplary embodiment of the present invention, a wheel receiving section contacts and securely holds a wheel of the wheeled vehicle. The wheel receiving section is removably attached to a lateral support section which extends outward from either side of the wheel receiving section and provides a broadened support base to resist the tendency of the vehicle to tilt over and fall.

In accordance with an exemplary embodiment of the present invention, the wheel receiving section may alternatively be removably attached to a tow adapting section, which interfaces the wheel receiving section with a standard receiver of a towing hitch as is commonly found on pick-up trucks and other towing vehicles.

In accordance with an exemplary embodiment of the present invention, the wheel receiving section may be detached from either the lateral support attachment and the tow adapting section to facilitate moving and storing of the support device.

BRIEF DESCRIPTION OF THE DRAWINGS

A fuller understanding of the present invention, as well as additional features and advantages, will be best provided by reviewing the following detailed description of an exemplary embodiment in conjunction with the accompanying drawings, wherein:

FIG. 8 is a pictorial view of a wheeled vehicle being tethered to another vehicle as might be accomplished using an embodiment of the present invention.

DETAILED DESCRIPTION OF EXEMPLARY EMBODIMENTS

The present invention is directed to a device for supporting a wheeled vehicle, such as a motorcycle, in a stable and substantially vertical position when the vehicle is resting on a supporting surface, such as on the ground, on a concrete floor, or on the bed of a truck.

Figure 1:
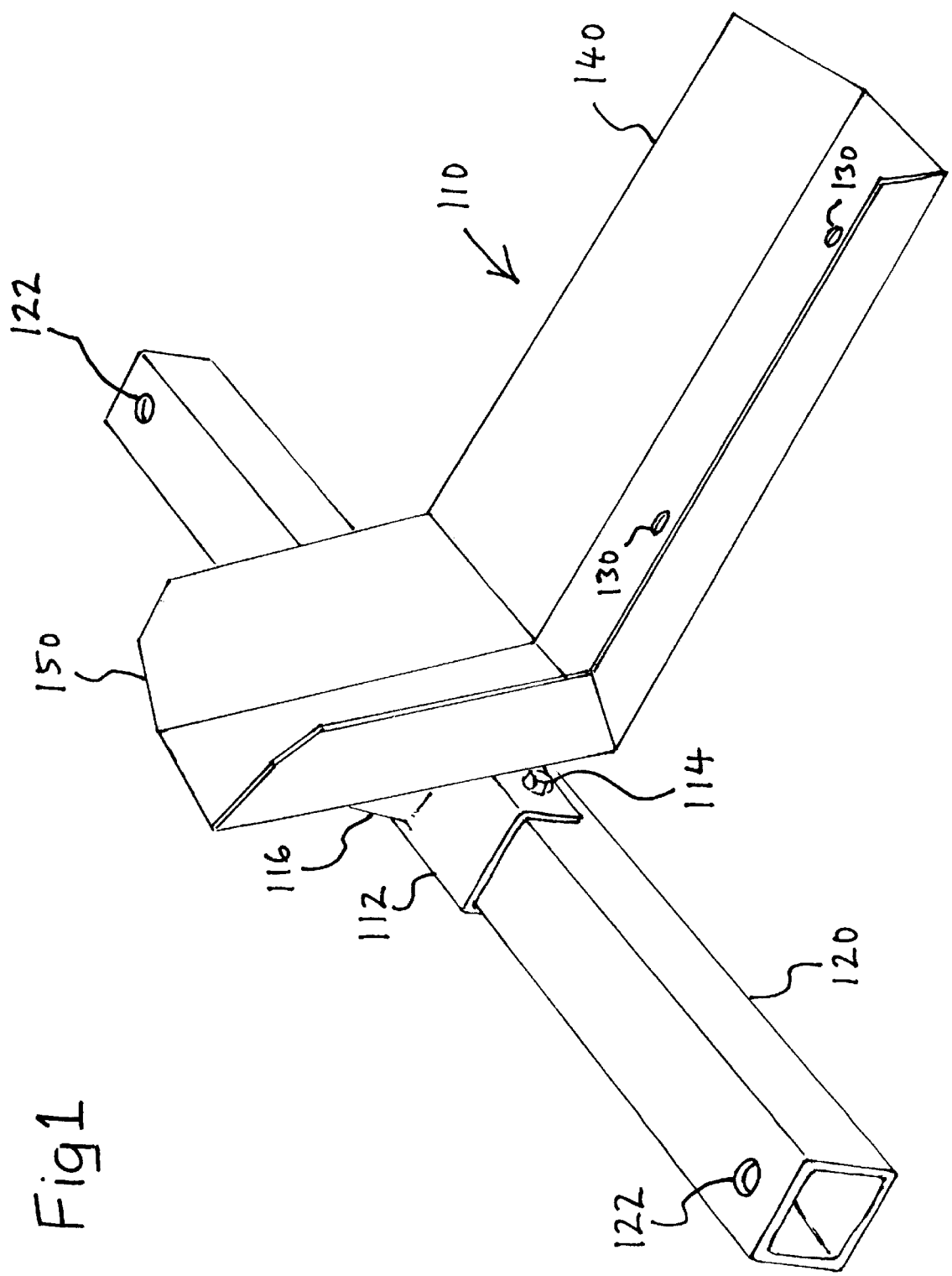
FIG. 1 is a pictorial view of a support device as an exemplary embodiment of the present invention, the support device being configured with a lateral support to steady a vehicle on a supporting surface.

Referring to FIG. 1 of the drawings, a wheel receiving section 110 is shown to comprise a base trough 140 and an inclined trough 150, which are joined as shown and may even be formed from a single piece of rigid material. For example, base trough 140 and inclined trough 150 may be made of metal and be formed by stamping, folding, or welding processes, or combinations thereof. In accordance with a preferred embodiment, all of the wheel receiving section, including base trough 140 and inclined trough 150, is formed from 0.125" thick iron or steel and is powder coated with a protective finish to prevent the metal from rusting or corroding.

Figure 3:
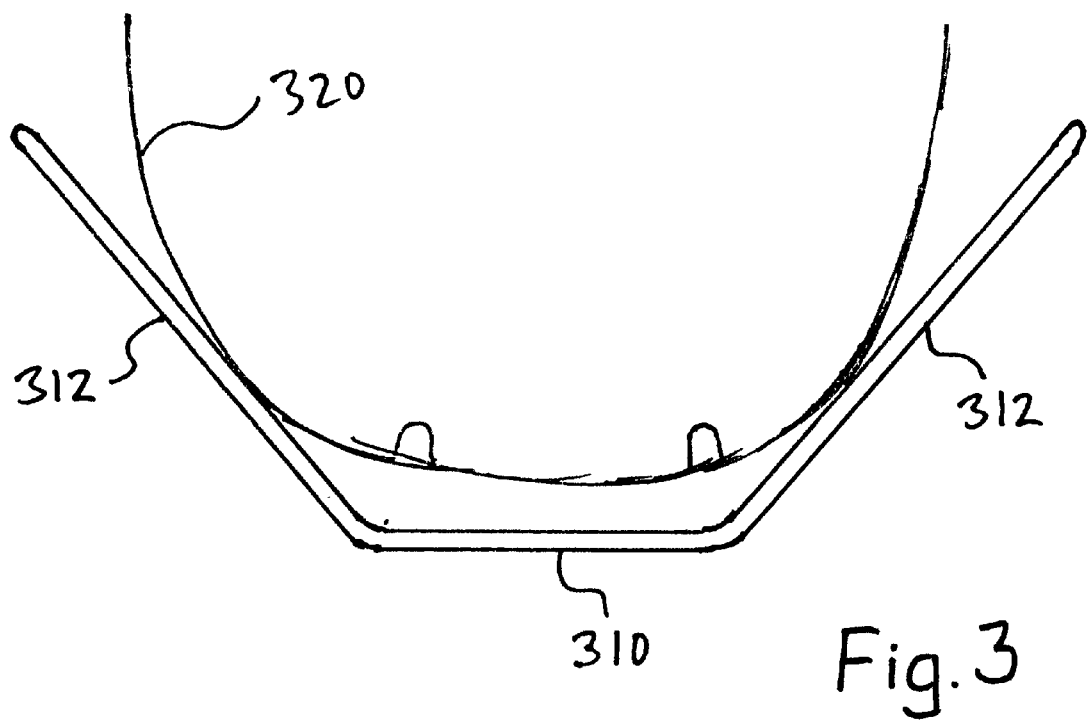
FIG. 3 is a cross-sectional view of a trough used to receive a vehicle wheel in accordance with a preferred embodiment of the present invention.

The purpose of wheel receiving section 110 is to provide a rigid implement that contacts a vehicle wheel sufficiently to prevent the wheel from rocking from side to side. To ensure positive engagement with a variety of wheel sizes, bottom trough 140 and inclined trough 150 portions of wheel receiving section 110 are preferably formed as shown in FIG. 3. Referring briefly to FIG. 3, an approximate cross-sectional view of one of the troughs is shown. In FIG. 3, trough bottom 310 provides a flat surface that is important for coupling the wheel receiving section to other pieces as will be described later. The width of trough bottom roughly determines the minimum width of a tire or wheel that can be rigidly held by the wheel receiving section. From either side of the trough bottom, trough walls 312 are bent inward to form the "sides" of the trough. The maximum outward extents of trough walls 312 roughly determine the maximum size vehicle tire or wheel which can be engaged and reliably held. A typical tire cross-section 320 is juxtaposed in FIG. 3 to show how the walls of a trough may engage the surface of a tire. The angling of trough walls serves to engage a range of tire sizes and also to causes resilient tires, such as pneumatic rubber tires, to wedge into tight engagement.

When the base trough and inclined trough are joined as shown in FIG. 1, the resulting wheel contacting assembly is particularly rigid and can hold a vehicle wheel firmly along at least four points of contact. Together, base trough 140 and inclined trough 150 may be referred to as a "shoe" for accommodating a vehicle wheel or tire. The shape of the shoe may be designed or selected to avoid interference with other parts of the held vehicle.

Those of skill in the art will recognize that certain economies can be achieved during manufacture by using similar cross-sections for both base trough 140 and inclined trough 150. For example, in some manufacturing processes, it may be feasible to form wheel receiving section 110 by cutting and bending a single extruded piece of material.

Figure 2:
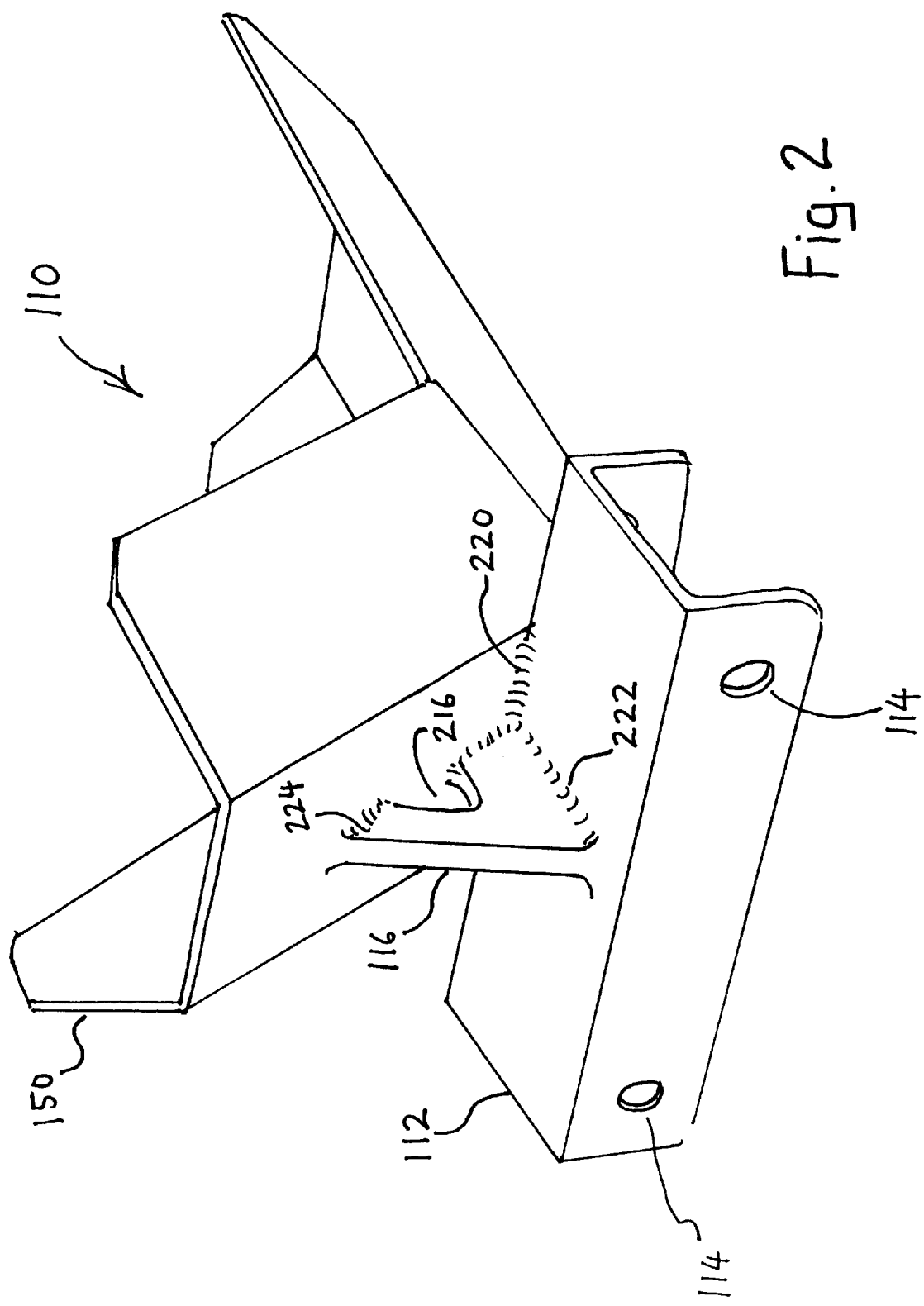
FIG. 2 is a pictorial view of a wheel receiving section in accordance with a preferred embodiment of the present invention.

FIG. 1 also shows wheel receiving section 110 to comprise an attachment channel 112 affixed to inclined trough 150 as reinforced by a gusset 116. An even better view of this feature is shown in FIG. 2. FIG. 2 depicts the manner in which attachment channel 112 is rigidly attached to inclined trough 150 and gusset 116. In accordance with a preferred embodiment, these elements are rigidly joined to one another by weld joints 220, 222 and 224 as shown. Also shown in FIG. 2, an opening 216 may provided through gusset 116 through which a chain or cord or similar means may be placed to wrap around a vehicle tire rim or the like. This feature can facilitate secure engagement of a wheel or tire into wheel receiving portion 110 and may also provide a convenient place to lock a vehicle tire to prevent theft of the vehicle.

The main purpose of attachment channel 112 is to provide a means to removably attach wheel receiving section 110 to various other elements, as will be described below. Attachment channel 112 primarily holds other elements in place by placing fasteners such as threaded bolts through holes 114.

Returning to FIG. 1 of the drawings, wheel receiving section 110 is shown to be temporarily attached to a lateral support beam 120. Note the manner in which the lateral support beam 120 nests into attachment channel 112 and is rigidly, but removably, held therein by bolts through holes 114. For assuring a firm and safe attachment in this application, it is advisable to use high quality threaded bolts in conjunction with lock nuts or the like. Although they are obscured in FIG. 1, lateral support beam 120 necessarily has corresponding holes through which such bolts are passed through beam 120 and attachment channel 112.

In accordance with a preferred embodiment, lateral support beam 120 is a hollow square channel made of iron or steel with holes drilled as shown to accommodate fasteners and provide other attachment points 122 and other features as will be described later. Attachment points 122 may be round or elongated holes in lateral support 120 or may be eyes, studs, or protrusions from lateral support 120, depending upon the manufacture.

FIG. 1 also depicts that base trough 140 has boltdown holes 130 disposed along the trough bottom so that the wheel receiving section 110 may be attached with fasteners, to a support surface upon which section 110 rests. For example, wheel receiving section, especially while attached to lateral support beam 120, may be bolted down to the bed of a pick-up truck or similar transport vehicle.

Figure 4:
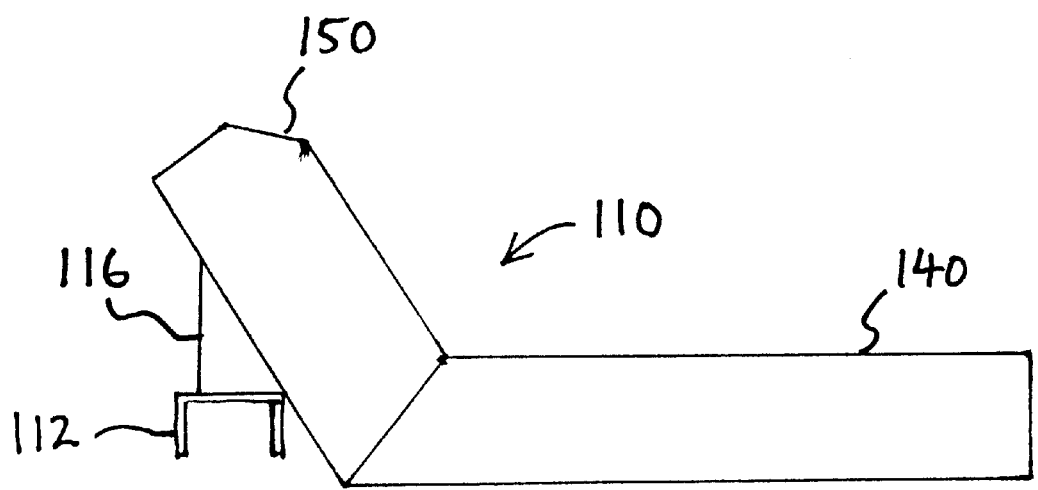
FIG. 4 is a side view of a wheel receiving section depicting the positions of the base trough and the inclined trough of the wheel receiving section in accordance with a preferred embodiment of the present invention.

Turning now to FIG. 4, a side view of wheel receiving section 110 is depicted to clearly show the relative positions of base trough 140, inclined trough 150, gusset 116 and attachment channel 112, in accordance with a preferred embodiment of the present invention. In particular, the base trough 140 is approximately twice as long as the inclined trough 150 and the dihedral angle formed therebetween is approximately 45 degrees. Another aspect evident in FIG. 4 is that inclined trough 150 has truncated upper corners. This non-essential portion of the wheel receiving section is trimmed off to promote safety, improve clearance for vehicle parts, to reduce stowage size and to improve aesthetic appeal. By providing a cutout section through gusset 116 or providing some other loop or similar feature on the shoe, it is possible to provide a placed for a chain or rope to be inserted through the vehicle wheel and the shoe to further secure them together. For example, a lock and chain may be used to discourage theft of the vehicle.

Figure 5:
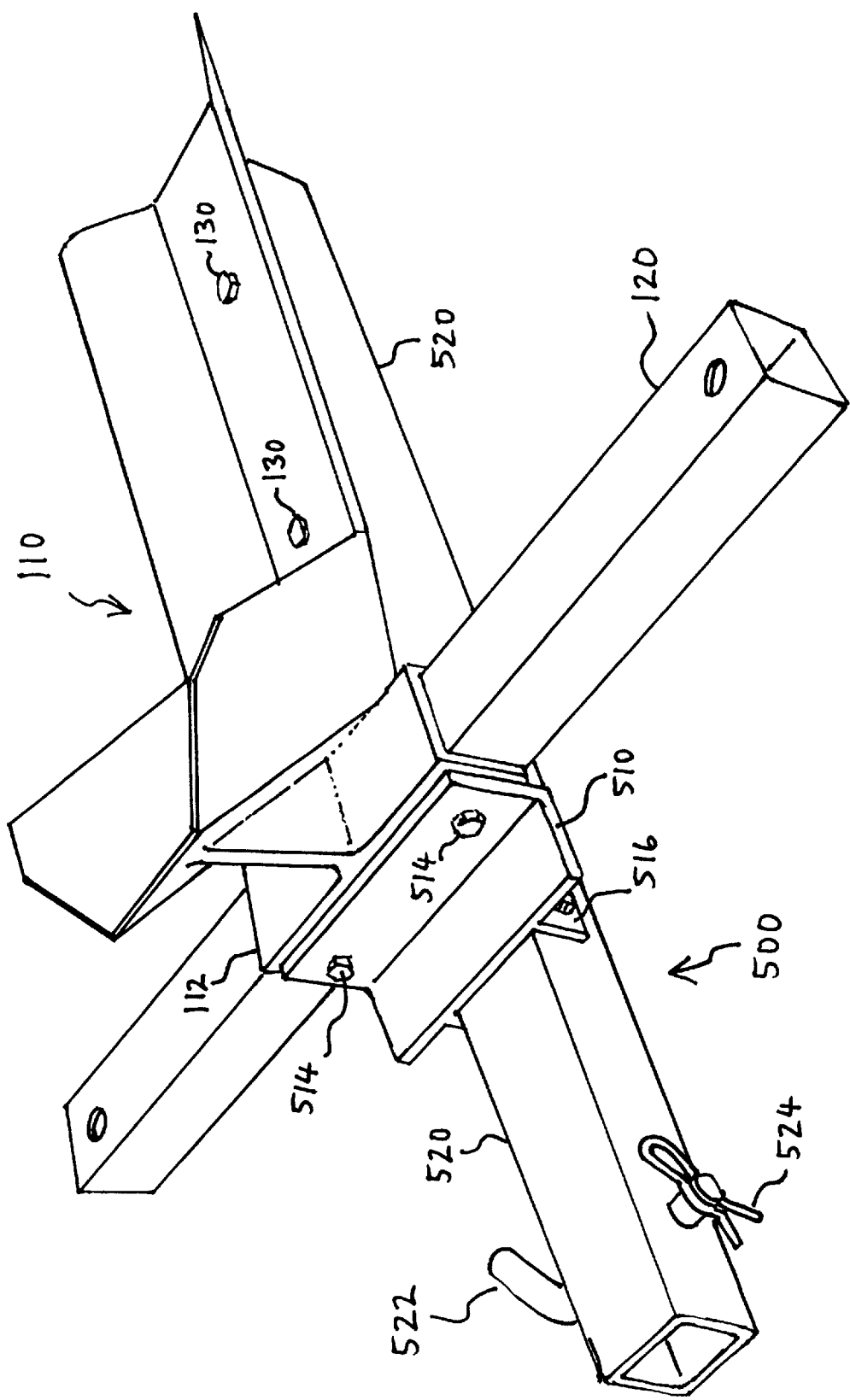
FIG. 5 is a pictorial view showing the wheel receiving section being removably attached to a tow attachment in accordance with an exemplary embodiment of the present invention.

In FIG. 5 the wheel receiving section 110 and lateral support beam 120 are shown to be further attached to a tow attachment 500. In this configuration, an implement is provided for supporting or towing a wheeled vehicle using another vehicle that has a standard square hitch receiver.

In FIG. 5, a hitch bar 520 is made to fit into a standard square hitch receiver. Hitch bar 520 supports the remainder of the assembly. As shown, in this configuration, wheel receiving section 110 is attached to hitch bar 520 through bolt holes 130. While not explicitly shown, those of skill in the art will recognize that hitch bar 520 may have corresponding through-holes or threaded holes or studs to facilitate this attachment. In addition to this attachment, hitch bar 520 is rigidly but removably joined to wheel receiving section 110 using hitch attaching bracket 510, which engages the outside of attachment channel 112. To join wheel receiving section 110, lateral support beam 120 and hitchbar 520, fasteners 514 are inserted through aligned holes through bracket 510, channel 112 and beam 120.

Bracket 510 is in turn attached to hitch bar 520 in some manner, such as through brackets 516 engaging either side of hitch bar 520. It is also possible to permanently join bracket 510 to hitch bar 520, such as by welding the parts together.

As is common practice, a hitch pin 522 and a retaining clip 524 are provided in conjunction with hitch bar 520 to secure the hitch bar in the hitch receiver of a towing vehicle.

Figure 6:
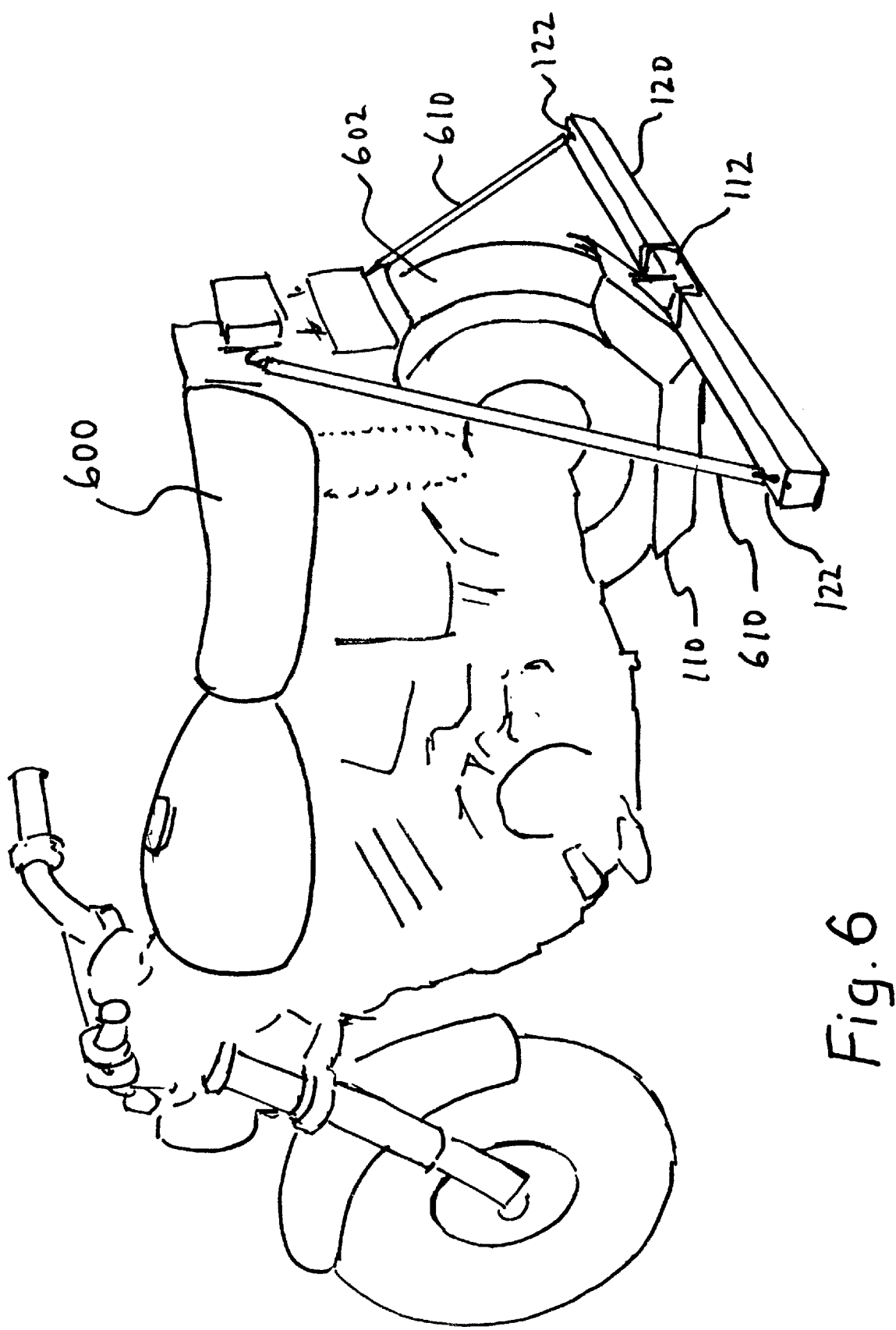
FIG. 6 is a pictorial view of a wheeled vehicle being held upright by a support device in accordance with a preferred embodiment of the present invention.

FIG. 6 depicts a vehicle being supported by a stand in accordance with an exemplary embodiment of the present invention. The vehicle 600 is a motorcycle resting on a flat surface, such as a concrete floor. In this case, the rear wheel 602 of the motorcycle is being held, although either wheel may be effectively held by the stand.

In the free-standing configuration shown in FIG. 6, only the wheel receiving section 110 and lateral support beam 120 are needed and are coupled together through the attachment channel 112.

Two support straps 610 are shown in FIG. 6 to help support the motorcycle in a upright position using attachment points 122 at the ends of the beam 120 as anchoring points. Note that beam 120 has holes or eyes provided at either end to accommodate the attaching of such straps. These straps are preferably made of a strong flexible material, such as nylon fabric, being adjustable in length and having tensioning means. However, it should be noted that any tensile element, such as a chain, may be used as a support strap. Alternatively, even a inflexible member, such as metal rod or pole, may be used to provide support between a point on vehicle 600 and lateral support beam 120.

Once a vehicle is attached in this manner, it cannot be tilted. To cause the bike to tip over would require that the center of mass of the bike extend beyond the beam end with respect to the direction of gravity. As the beam end is some 24" out, this would require raising the weight of the bike almost straight up by a considerable distance. In practice, persons servicing the bike have been able to stand on the bike and crank the engine, even with the front wheel removed or with the frame of the vehicle suspended off of the ground.

Those of ordinary skill will readily appreciate that the method of support depicted in FIG. 6 enables multiple vehicles, each independently supported by such an arrangement, to be placed in close proximity to one another. In actual practice, by staggering of placement or alternating of orientation, vehicles supported in this manner have been placed substantially against one another side-by-side without risk of a "domino effect." This practice saves considerable floor space where many vehicles need to be stored. Vehicles stored thus may be slid into position or may be rolled if casters are provided on lateral support 120.

Figure 7:
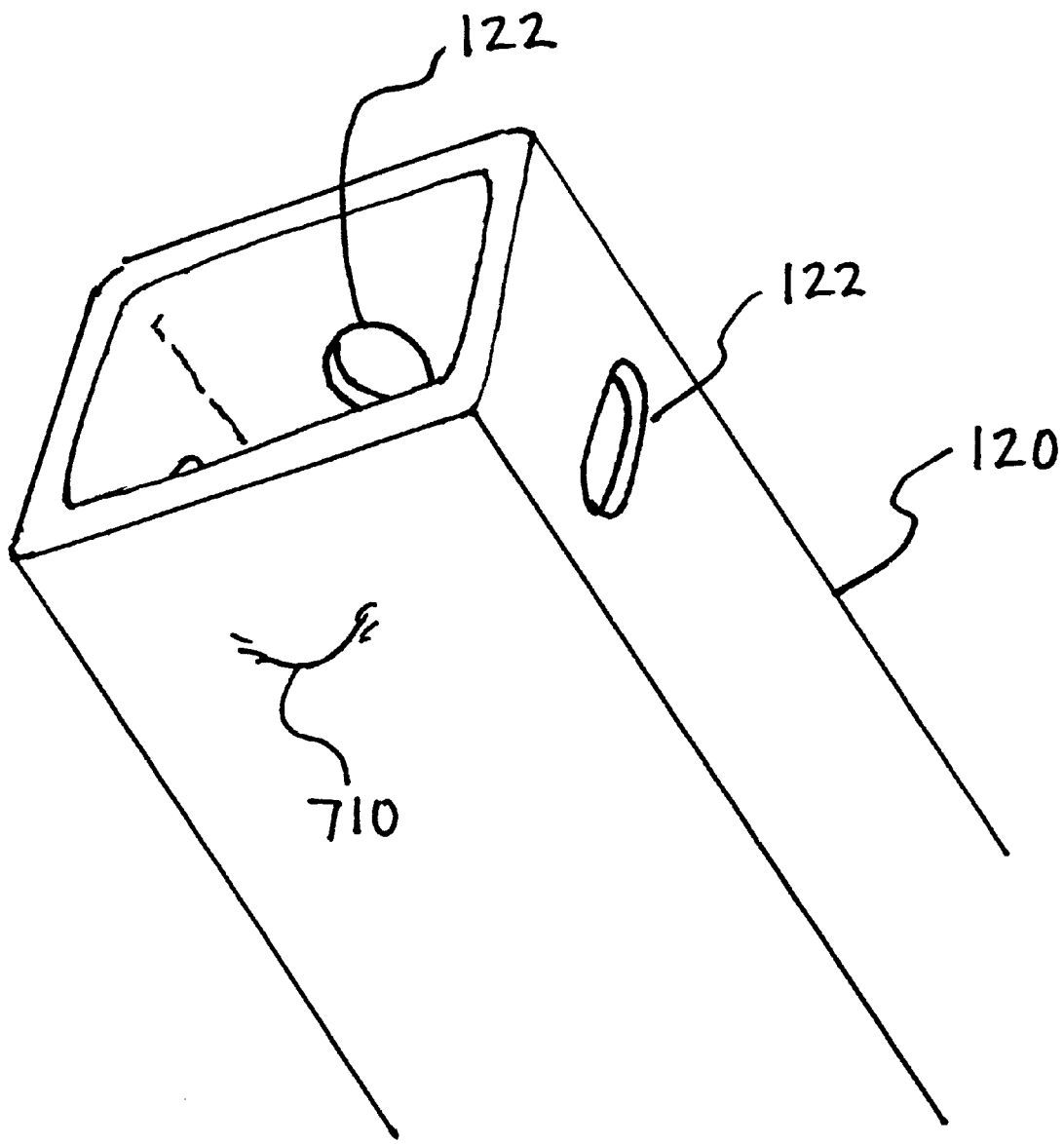
FIG. 7 is a pictorial view of one end of a lateral support member.

FIG. 7 is a pictorial view of one end of lateral support beam 120 in accordance with a preferred exemplary embodiment of the present invention. As described earlier, lateral support beam 120 may comprise various features, such as holes for attachment points 122, by which support straps 610 or the like may be attached to either end of lateral support beam 120. Attachment point 122 in the form of a hole may accommodate a metal hook at the end of such straps or may be used to attach an eye bolt or the like to the distal ends of lateral support beam 120. As those of skill in the art will appreciate, attachment point 120 may be an elongated hole to facilitate the use of certain types of attachments thereto.

FIG. 7 also depicts a dimple 710 on the downward facing side of lateral support beam 120, that is, the side of beam 120 that faces a supporting surface. Dimple 710 is preferably formed outwardly to provide a small outward displacement at either end of lateral support beam 120. Dimple 710 serves to keep the assembled support device from swiveling as the held vehicle is rolled onto the base trough portion. Dimple 710 ensures a reliable three-point contact of the support device with a flat or nearly flat supporting surface. As an alternative to dimple 710, the head of a carriage bolt or other fastener may be used to provide a similar protrusion along the underside of the lateral support beam.

FIG. 8 illustrates wheeled vehicle 600 being tethered to another vehicle as might be accomplished using an embodiment of the present invention. FIG. 8 depicts that the vehicle support arrangement shown in FIG. 5 is holding one wheel of vehicle 600 in position behind a towing vehicle 800. Hitch bar 520 is fastened to lateral support beam 120 and to wheel receiving section 110 forming a rigid assembly for holding the front wheel of vehicle 800. In a manner described earlier, vehicle 600 is held substantially upright by one or more support straps 610 attached between vehicle 600 and lateral support beam 120.

In FIG. 8, hitch bar 520 is inserted and held within hitch receiver 810. Hitch receiver 810 is attached to towing vehicle 800 and generally remains attached thereto. Hitch bar 520 and hitch receiver 810 form a rigid mechanical coupling yet may be easily detached from one another. Through coupling to hitch receiver 810, hitch bar 520 is supported upward against the pull of gravity and in several other ways. Hitch bar 520 is supported in a cantilever fashion so that the partial weight of vehicle 600 does not cause the support assembly to sag downward. Furthermore, hitch bar 520 is prevented from rotating relative to hitch receiver 810, which would otherwise allow a two-wheeled vehicle 600 to fall over. The coupling of hitch bar 520 to hitch receiver 810 provides coupling of forces so that forward motion of towing vehicle 800 is imparted to vehicle 600.

Those of ordinary skill in the art will recognize that this arrangement of a square hitch bar to a hitch receiver is but one suitable exemplary implementation. This arrangement may be generalized to many forms of detachable mechanical coupling between the wheel receiving section and any solid object, wherein the coupling provides needed support to the vehicle along one or more axes.

Those of ordinary skill in the art will understand that many variations are possible aside from exemplary embodiment described thus far. For example, a lateral support element may be permanently attached to a wheel receiving section while a hitch bar may be a removable option. Alternatively, a hitch bar may be permanently attached while the lateral support may be removable.

As the present invention is subject to many variations, modifications, and changes in detail, it is intended that all matters described in this specification and shown in the accompanying drawings be interpreted as illustrative only and not in a limiting sense. The spirit and scope of the present invention should be determined by interpretation of the claims appended hereto.

What is claimed is:

1. A support device for supporting a wheeled vehicle upon a supporting surface, the device comprising:
   at least one wheel engaging section which firmly holds at least one wheel of the wheeled vehicle and which comprises at least one structural element for receiving interchangeable attachments, wherein the structural element is configured to receive a lateral support which substantially bears upon the supporting surface to resist tilting of the vehicle with respect to the supporting surface and wherein the structural element is configured to receive a hitch bar element for mechanically coupling the support device to a solid object having a receiver for the hitch bar element.

2. The support device of claim 1 further comprising:
   at least one lateral support rigidly coupled to the wheel engaging section which substantially bears upon the supporting surface to resist tilting of the vehicle with respect to the supporting surface, wherein the lateral support comprises at least one protrusion towards the supporting surface to facilitate consistent position of contact between the lateral support and the supporting surface.

3. The support device of claim 2 wherein the lateral support is removable from the wheel engaging section to facilitate storing or transporting the support device.

4. The support device of claim 2 wherein the support device has a mass of less than 30 kilograms.

5. The support device of claim 2 wherein the lateral support extends substantially outward approximately normal to the vehicle and does not extend substantially alongside the vehicle.

6. The support device of claim 2 wherein the lateral support comprises at least one attachment point whereby at least one holding means may be attached to both the vehicle and the lateral support to hold the vehicle in a fixed position with respect to the lateral support.

7. The support device of claim 6 wherein the lateral support is removable from the wheel engaging section to facilitate storing or transporting the support device.

8. The support device of claim 6 wherein the support device has a mass of less than 30 kilograms.

9. The support device of claim 1 wherein the structural element is configured to simultaneously receive both the lateral support and the hitch bar element.

10. The support device of claim 1 wherein the structural element is configured to allow the hitch bar element, when coupled to the support device via the structural element, to also be further attached directly to a bottom portion of the wheel engaging section.

11. A support device facilitating use in multiple configurations for supporting a wheeled vehicle with respect to a supporting surface, the device comprising:
    at least one wheel engaging section having a base trough portion comprising a trough bottom onto which at least one wheel of the wheeled vehicle may be placed, the trough bottom when in use extending substantially between the vehicle wheel and the supporting surface and bearing force applied by the wheel toward the supporting surface; and
    at least one support attaching section rigidly attached to the wheel engaging section by which at least one lateral support may be removably attached to the wheel engaging section,
    wherein the support attaching section is positioned relative to the trough bottom such that, with the lateral support attached to the support attaching section and with the trough bottom positioned substantially near to and substantially parallel with the supporting surface, the lateral support bears substantially upon the supporting surface to resist tilting, in at least one axis of rotation, of the wheel engaging section relative to the supporting surface, and wherein the support attaching section is positioned relative to the trough bottom such that the lateral support may comprise a rigid element of sufficient dimension to extend outward on either side of the support device while the trough bottom remains positioned substantially near to and substantially parallel with the supporting surface.

12. The support device of claim 11 wherein the support attaching section holds the lateral support at a position relative to the trough bottom position such that a thickness dimension of the trough bottom may be substantially less than a cross-sectional dimension of the lateral support.

13. The support device of claim 11 wherein the support attaching section is configured to hold the lateral support at a fixed position relative to the wheel engaging section and is positioned relative to the base trough to allow the trough bottom to rest substantially near to and parallel with the supporting surface when the lateral support is attached to the wheel engaging section via the support attaching section.

14. The support device of claim 13 wherein the support attaching section is positioned relative to the base trough such that, when the lateral support is attached via the support attaching section, the trough bottom remains substantially near to and parallel to the supporting surface such that the rolling of the vehicle wheel from the supporting surface onto the wheel engaging section is negligibly impeded.

15. The support device of claim 11 wherein the support attaching section is positioned relative to the base trough to allow the trough bottom to rest substantially near to and parallel with the supporting surface such that the rolling of the vehicle wheel from the supporting surface onto the wheel engaging section is negligibly impeded.

16. The support device of claim 11 wherein the base trough portion rests substantially flatly upon the supporting surface when the support device is used in accordance with a first configuration.

17. The support device of claim 16 wherein the base trough comprises at least one fastener receiving means for facilitating fastening of the base trough to the supporting surface using at least one fastener in accordance with the first configuration.

18. The support device of claim 17 wherein the fastener receiving means facilitates fastening of a hitchbar to the base trough in accordance with a second configuration wherein the support devices becomes adapted for being coupled to a towing vehicle.

19. The support device of claim 18 wherein the support attaching section is configured to allow the hitchbar to be further removably attached to the support attaching section in accordance with the second configuration.

20. The support device of claim 18 wherein the support attaching section is configured such that both the lateral support and the hitchbar may be concurrently attached via the support attaching section.

* * * * *